(12) United States Patent
Tyler et al.

(10) Patent No.: US 12,712,839 B2
(45) Date of Patent: Aug. 18, 2026

(54) ENCODING DATA IN MESSAGE HEADERS

(71) Applicant: Mimecast Services Ltd., London (GB)

(72) Inventors: Simon Paul Tyler, Wiltshire (GB); Jackie Anne Maylor, Wiltshire (GB); Carlos da Silva, Vila Nova de Gaia (PT); Nathaniel S. Borenstein, Greenbush, MI (US)

(73) Assignee: Mimecast Services Ltd., London (GB)

( * ) Notice: Subject to any disclaimer, the term of this patent is extended or adjusted under 35 U.S.C. 154(b) by 93 days.

(21) Appl. No.: 18/950,788

(22) Filed: Nov. 18, 2024

(65) Prior Publication Data

US 2025/0193140 A1 Jun. 12, 2025

Related U.S. Application Data

(63) Continuation-in-part of application No. 18/244,000, filed on Sep. 8, 2023, now Pat. No. 12,184,600, and a continuation-in-part of application No. 17/735,692, filed on May 3, 2022, now Pat. No. 12,149,605, said application No. 18/244,000 is a continuation of application No. 17/465,545, filed on Sep. 2, 2021, now Pat. No. 11,777,885, which is a continuation of application No. 13/950,785, filed on Jul. 25, 2013, now Pat. No. 11,121,995.

(51) Int. Cl.
*H04L 51/216* (2022.01)

(52) U.S. Cl.
CPC .................................. *H04L 51/216* (2022.05)

(58) Field of Classification Search
CPC ..................................................... H04L 51/216
See application file for complete search history.

(56) References Cited

U.S. PATENT DOCUMENTS 8,190,878 B2 * 5/2012 Stern .................. H04L 63/0407 713/153
8,583,739 B2 * 11/2013 Elfner .................. H04L 51/214 726/13
10,587,564 B2 * 3/2020 Chang .................. H04L 51/234
2002/0120697 A1 * 8/2002 Generous ............. H04L 67/306 709/206
2008/0270545 A1 * 10/2008 Howe ................. G06Q 10/107 709/206
2010/0088512 A1 * 4/2010 Schwartz ............. H04L 9/3236 713/168
2015/0019652 A1 * 1/2015 Ordogh ................ H04L 51/234 709/206

* cited by examiner

*Primary Examiner* — Nazia Naoreen
(74) *Attorney, Agent, or Firm* — Nutter McClennen & Fish LLP

(57) ABSTRACT

Among other things, we describe techniques for carrying encoded data in a header field of an email message wherein the encoded data is homomorphically encrypted such that the encoded data is only interpretable by one or more authorized recipients and operable by any recipient. A recipient of such an email message (which may be the sender or another recipient) can derive an action to be carried out from the homomorphically-encrypted encoded data.

20 Claims, 8 Drawing Sheets

206a
208
212
Message-ID:
Data
204a
200
202
214

206b
208
212
In-Reply-To:
Data
204b
200
202
214

206c
208
212
In-Reply-To:
Data
204c
202
210
214

218
216
208
Data
220
222
214

ENCODING DATA IN MESSAGE HEADERS

CROSS-REFERENCE TO RELATED APPLICATION(S)

This patent application is a continuation-in-part of U.S. patent application Ser. No. 18/244,000 entitled ENCODING DATA IN EMAIL HEADERS filed Sep. 8, 2023, which is a continuation of U.S. patent application Ser. No. 17/465,545 entitled ENCODING DATA IN EMAIL HEADERS filed Sep. 2, 2021 (now U.S. Pat. No. 11,777,885 issued Oct. 3, 2023), which is a continuation of U.S. patent application Ser. No. 13/950,785 entitled ENCODING EXECUTABLE INSTRUCTIONS AND COMPUTATIONAL STATE IN EMAIL HEADERS filed Jul. 25, 2013 (now U.S. Pat. No. 11,121,995 issued on Sep. 14, 2021), each of which is hereby incorporated herein by reference in its entirety.

This patent application is also a continuation-in-part of U.S. patent application Ser. No. 17/735,692 entitled HOMOMORPHICALLY ENCRYPTED DATA IN EMAIL HEADERS filed May 3, 2022 (issuing as U.S. Pat. No. 12,149,605 on Nov. 19, 2024), which is hereby incorporated herein by reference in its entirety.

BACKGROUND

This description relates to encoding data in email headers. Electronic devices can be used to communicate information with other electronic devices using a variety of protocols. As an example, electronic mail (email) is a message-exchange framework that is commonly used on the Internet and other communication networks.

SUMMARY

The encoding data in email headers that is described here may encompass one or more of the following (and other) aspect, features, and implementations, and combinations of them.

In general, a method includes at a first electronic communication system, transmitting a first email message that includes a first header field including encoded data relating to information in the first email message. The first encoded data is homomorphically encrypted, such that it is only interpretable by authorized recipients, but is operable by any recipient. The method further includes, at a second electronic communication system, receiving a second email message that includes a second header field containing the encrypted encoded data from the first email message.

In some embodiments, the second electronic communication system is the same as the first electronic communication system. In other embodiments, the second electronic communication system is an electronic communication system other than the first electronic communication system.

In another embodiment of the invention, the encrypted encoded data may be in one or more of an In-Reply-To field, and/or a Message-ID field. The encrypted encoded data may include archive data to allow an electronic communication system to perform email archive operations without accessing a local system.

When the second electronic communication system is associated with an authorized recipient, the method of the current invention may also include decrypting the encrypted encoded data and processing the second email message based on the encoded data.

The encrypted encoded data may comprise one or more of receipt metadata, receipt decisions, receipt entities, and/or receipt hashes. The encrypted encoded data may also indicate a message's trust level.

In some embodiments, the encrypted encoded data is unwritten upon leaving the first electronic communication system, and/or is blocked from entering the second electronic communication system.

The encrypted encoded data of the present invention may be related to one or more of compliance, training, internal routing, and/or email tracking.

In general, another embodiment of the present invention includes an electronic communication system comprising one or more computers and one or more storage devices storing instructions that are operable when executed by one or more computers, to cause the one or more computers to perform operations comprising transmitting a first email message that includes a first header field including first homomorphically encrypted encoded data relating to information in the first email message, and receiving a second email message that includes a second header field containing second homomorphically encrypted encoded data, and deriving an action to be carried out from the second encoded data.

In an embodiment, the action to be carried out comprises executing, in a stateless manner, a command that is identified uniquely by one or more of the encoded data, and/or a context in which the action it to be carried out. The action to be carried out may comprise altering a characteristic of the second email based on the encoded data, and/or sending a third email based on the encoded data.

In various embodiments of the invention, the message header comprises security features associating the data with a user.

In some embodiments, the electronic communication system is an email client and/or email server.

In some embodiments, at least one of the first encoded data or the second encoded data includes information that encodes one or more portions of the email message, one or more portions including at least one portion of a subject header field of the email message, and/or at least one portion of the body of the email message. In some embodiments, the encoded data may be the result of a hash function applied to one or more of the portions.

In various embodiments, the encoded data is one or more of receipt metadata, receipt decisions, receipt entities, and/or receipt hashes.

In some embodiments, the encoded data is unwritten upon leaving the first electronic communication system. In some embodiments, the encoded data is blocked from entering the second electronic communication system.

The encoded data may be related to one or more of compliance, training, internal routing, and/or email tracking.

BRIEF DESCRIPTION OF THE DRAWINGS

FIG. 8 is a block diagram of an example computer system.

DETAILED DESCRIPTION

Figure 1:
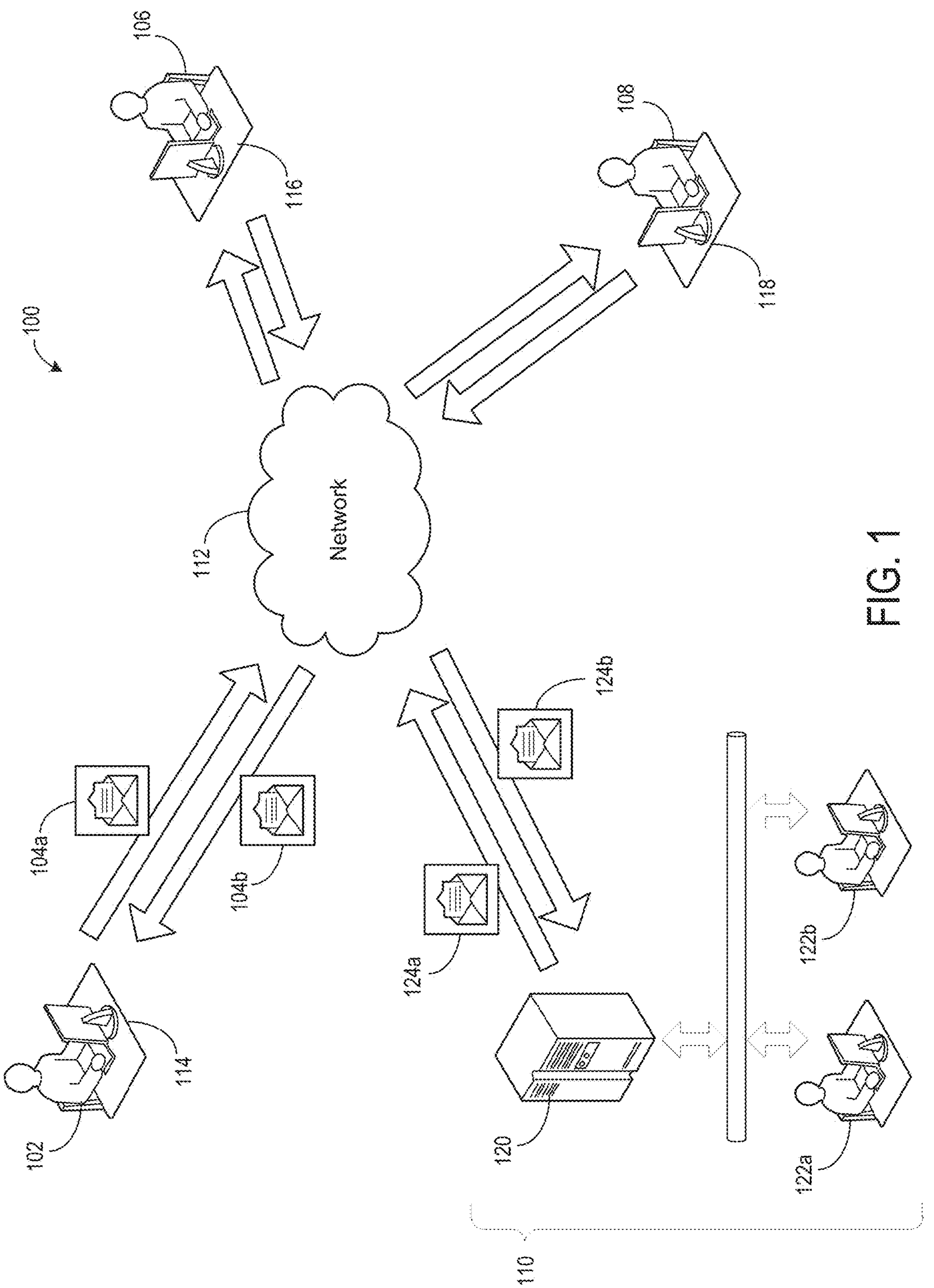
FIGS. 1, 2A, 2B, 2C, 2D, 3A, 3B and 8 are block diagrams.

An electronic communication system can encode data in an electronic message that will be included in subsequent messages transmitted by other electronic communication systems.

Electronic communication systems enable different entities to communicate, handle and process electronic communications. Various types of electronic communication exist, using various types of electronic communication protocols. An electronic communication may include various types of content, such as text, data, voice, images, video, etc. An electronic communication can be transmitted and received between various types of electronic communication systems, such as personal desktop computers, server computing systems, mobile computing devices, etc. An example of a type of electronic communication is an email message. An email message has at least one receiving entity and can have multiple receiving entities.

The term entity is used herein in a broad sense, and includes individual users or groups of users, such as an organization. An entity is typically associated with an electronic communication address, such as an email address, which can be used by other entities to send electronic communications to the entity. An email address can be associated with a single user, or an email address may be associated with a group of people, such as an organization or a mailing list.

Similarly, the term "archive" is used herein in a broad sense, and can include any type of storage system including, without limitation, a data archive system, a compliance archive, a threat intelligence system, a graph database, a CESS network, etc.

There are different types of electronic communication systems that can be used to send and receive electronic communications. For example, an email application running on an entity's computing device (often called a "client") allows the entity to interact with an email system, which carries out the actions of sending and receiving email messages sent to and from a variety of entities on a variety of computer systems (e.g., personal computers, smart phones, tablet computers, and other types of computer systems). An email system can run on one or more servers and provide various email services to the email applications running on clients. An email system typically operates according to standardized email protocols for sending and receiving messages. Typical email protocols include SMTP, POP3, and IMAP.

In some examples, email applications can be accessed using various application interfaces. In some examples, email applications are accessed using a web browser interface, a custom application interface (e.g., a dedicated email application or a file system interface of an operating system), a general use mobile application (e.g., email application), a specialized use mobile application (e.g., custom mobile application written for use with a particular system), or another kind of interface. In some examples, the application interface may be an application programming interface (API) that interacts with software components. In some examples, an API can be programmed to automatically access the email application and to perform certain actions based on contents of received email messages.

There are various ways that entities can send, receive, and handle electronic communications. For example, if the electronic communication is an email message, then the exchange and handling of email messages follows one or more standards, such as those defined by the Internet Engineering Task Force (IETF). For example, an entity can send identical copies of an email message to multiple receiving entities. This can be achieved by directly addressing the email message to multiple recipients, and/or by using "carbon copy" or "blind carbon copy," the latter being used to hide the identity of one or more recipients from other recipients. In some examples, an entity that receives an email message can forward it to other entities, by sending a new email message that includes the text of the original message. In some examples, an entity may classify, into sub-categories or folders, different email messages that the entity had previously sent and/or received.

The system and techniques that we describe here can be implemented to enable an entity sending an electronic communication to include encoded data into the electronic communication in such a way that the encoded data is automatically preserved in subsequent electronic communications that are replies to and/or forwards of the electronic communication. The encoded data may encode an action, selected by the entity, to be performed upon receiving a subsequent reply and/or forward of the electronic communication. An action to be carried out by an electronic communication system may be defined based on input received from a user. In some examples, an action may have been defined directly based on an input by a user (e.g., by an individual user or by a user among a group of users, e.g., an organization) who specifies that the action is to be encoded into encoded data that is included in the particular outgoing electronic communication. In some examples, an action may have been defined indirectly based on an input by a user who specifies the action as part of an automated process that encodes the action into encoded data that is included in multiple outgoing electronic communications, which includes the particular outgoing electronic communication.

By "encoded data," we mean any data that is encoded (e.g., formatted) in a manner that can be included in an electronic communication. The manner in which the data is encoded may depend on the format of the electronic communication, or characteristics of the data to be encoded, and/or other factors. We sometimes describe "encoding" or "decoding" the data, which refers to formatting the data (e.g., putting the data in a format suitable for transmission) or interpreting the data (e.g., identifying contents of the encoded data).

In some implementations, the encoded data may be included in portions of an electronic communication that are automatically extracted and then included in subsequent electronic communications by other entities, even if the other entities are unaware of, or unable to access, the encoded data. For convenience, encoded data that persists across multiple electronic communications may be referred to herein as a "cookie." In some implementations, the encoded data may be encrypted so that the encoded data is not accessible to entities for whom the encoded data is not intended. Regardless of whether an entity is aware of, or is able to access, encoded data that is included in an electronic communication, an electronic communication system operated by the entity may automatically extract and include the encoded data in subsequent electronic communications. As such, the system may require no client side changes on the part of an entity replying to or forwarding the electronic communication that contains the encoded data.

In some implementations, the encoded data could be included in standard header fields of an email message. By "standard header fields," we mean header fields defined by standards for electronic communication. The header fields could be defined by appropriate IETF standards, such as Request for Comments (RFC) 822 and Multipurpose Internet Mail Extensions (MIME). As examples, such header fields could be, but are not limited to message originator header fields (e.g., "From," "Resent-From," "Reply-To"), or message recipient header fields (e.g., "To," "Cc," "Bcc," "Resent-To," "Resent-Cc," "Resent-Bcc"), or message-id related header fields (e.g., "Message-ID," "In-Reply-To," "References"). When the encoded data is included in such header fields of an email message, recipient email clients and/or servers will extract and include the encoded data in subsequent replies and/or forwards, even without necessarily being aware of the presence of the encoded data in the header fields and/or without having any functionality specific to encoding or decoding the data.

Communication systems other than email systems may also support header fields that can be used in this same way. For example, communication systems used for text messages (e.g., Short Message Service [SMS]), instant messages (Extensible Messaging and Presence Protocol [XMPP]), and multimedia messages (e.g., Multimedia Message Service [MMS], and Session Initiation Protocol [SIP]) may support or can be modified to support header fields that can be used in this way.

In some implementations, the encoded data (e.g., cookie) may be secure from access by unauthorized entities. For example, the encoded data may be encrypted and the email message header may include authentication credentials, such as an electronic signature, that relates the encoded data to the identity of an authorized entity (e.g., the entity that included the data, or another entity for whom the encoded data is intended).

In some implementations, the encoded data (e.g., cookie) may be homomorphically encrypted so as to allow a third party to manipulate and/or interact with the encoded data without being able to decrypt the individual values stored within the encrypted data.

In some implementations systems that utilize such encoded data may be stateless, in the sense that separate storage for system state may not be needed in order to process the instructions in the encoded data. Instead, all the information needed to perform the desired action is encoded in email message headers such as the headers described above. In some examples, this stateless feature can enable systems to scale to larger dimensions without a necessarily requiring a corresponding growth in storage facilities for maintaining state to match received information to desired instructions. In some implementations, this may facilitate deployment in large communication networks with a large number of users. In some implementations, some state information could be stored and remain persistent between multiple email messages, to facilitate interpreting the encoded data extracted from email message headers. For example, a message header field may include a database key that enables an entity to access a database to retrieve instructions to perform. In some implementations, this may be added for security reasons, because even if an unauthorized entity were to extract a database key, the unauthorized entity may not be able to access the database for which the key is intended (e.g., if the database is local to the intended entity, if the database has security features limited access, etc.).

In some implementations, the encoded data may be archive-less. By using the encoded data, an archive of actions on the electronic communication is not needed as the encoded data itself stores the results of an action taken, eliminating the need to repeat actions or use storage space to store the results of the actions. For example, in the case of a business email compromise (BEC) impersonation message, the system may automatically present a low confidence warning that the email may not be legitimate. This low confidence information may be encoded in the message, and upon a user attempting to reply to the suspicious message, a prompt may appear confirming that the user wishes to reply to the suspicious message. By utilizing encoded data in this way, an archive of the suspicious message information is not needed, allowing for more efficient management of messages.

Independent of the content of the data that is encoded in the electronic communication, and independent of whether that information is completely self-contained in the electronic communication or accessible via stored state information, the encoded data can be included in electronic communications in such a way that it is automatically preserved in subsequent replies to and/or forwards of the electronic communication, even if the replying and/or forwarding entities are not aware of, or not authorized to access, the encoded data.

Such techniques can be applied to other types of electronic communication and electronic communication protocols, other than email. For example, if another type of electronic communication has a portion of the electronic communication that is automatically extracted and included in subsequent electronic communications that are in reply to, or forwards of, the electronic communication, then techniques described here can be used to include encoded data into the electronic communication in such a way that the encoded data is automatically included in the subsequent electronic communications.

FIG. 1 is a block diagram of an example communications system 100 that enables entities to include encoded data into electronic communications in such a way that the encoded data is automatically and securely preserved in subsequent electronic communications sent by other entities, according to some implementations. An entity, such as the user 102, exchanges electronic communications, such as emails 104*a*, 104*b*, with other entities, such as another user 106, or a third user 108, or an organization 110. The communication is enabled by a communication network, such as the network 112, which can be the Internet, a local area network (LAN), or any appropriate communication network. The user 102 can use a computing system 114, such as a personal computer, laptop, portable device, or any other computing system, to send and receive emails. A user 102 using the computing system 114 can send and receive emails by using a client email application installed on the computing system 114, or by using an interface, such as a web browser, to access a remote email server that performs the sending and receiving.

In some implementations, if the computing system 114 of the user 102 includes encoded data in an outgoing email message 104*a* sent to another user 106, then the encoded data that was included in the email message 104*a* can be automatically returned to the user 102 in a subsequent reply email message 104*b* sent by the other user 106, without the other user 106 even being aware of the presence of the encoded data. The encoded data can be any data that the user 102 wishes to include that can be decoded by a communication system, such as data that indicates an action to be carried out by the computing system 114 of the user 102 upon receiving the reply email 104*b*. In some implementations, the computing system 116 of the other user 106 receiving the original email message 104*a* can also be made aware of, and allowed to extract, the encoded data included in email message 104*a*. In such cases, the computing system 116 of the other user 106 can also use the encoded data to perform any action that is indicated by the data.

As another example, the computing system 114 of the user 102 can include encoded data in the outgoing email 104*a* to the other user 106 in such a way that the encoded data is automatically included in any subsequent forwards of the email message 104a by the computing system 116 of the other user 106. For example, if the other user 106 receives the email message 104a and forwards it in another email message to the third user 108, then the encoded data that was included in the original email message 104a can be automatically carried over to the forwarded email message by the computing system 116 of the other user 106. The forwarding user 106 need not necessarily be aware of the presence of the encoded data that was carried over but can, in some implementations, be allowed to extract and process the encoded data. In some implementations, the forwarding user 106 may be allowed to extract and process encrypted encoded data without decrypting because the encrypted data is homomorphically encrypted, allowing manipulation/interaction with the encoded data. The third user 108, upon receiving the forwarded email message containing the encoded data, can extract the encoded data from the forwarded email message and perform any appropriate action indicated by the data.

As another example, an entity, such as the organization 110, can use the techniques described here to enable features of email communication with entities external to and within the organization 110. The organization 110 can utilize a computing system, such as email server 120, to handle the sending and receiving of email messages on behalf of other entities within the organization 110, such as a first user 122a and a second user 122b. The email server 120 and the first and second users 122a and 122b can communicate using any communication network, either wired or wireless, within the organization 110.

The organization 110 may use a single email address, such as "info@company.org," to communicate with entities external to the organization 110. In some implementations, data can be encoded in outgoing emails from that email address, and be extracted from incoming replies to route emails sent to the generic email account to the right person within the organization 110. Thus, the organization 110 could handle replies sent to a single generic email address in different ways.

This may also be used in situations where external anonymity of entities within an organization is desired. For example, in FIG. 1, entities that are external to the organization 110 could communicate with the first and second users 122a and 122b via a single generic email address associated with organization 110, without necessarily knowing the individual email addresses of each of the first and second users 122a and 122b. This "single-address" technique could also enable anonymous or pseudonymous emailing, in which replies to a single email address can be selectively routed to different people based on the encoded data received in the reply emails.

As one example of enabling this single-address technique, the server 120 could include different types of encoded data in the header of an outgoing electronic communication, such as email message 124a. As an example, the encoded data could depend on the nature of the outgoing email 124a, such as whether the email relates to a promotional event, or relates to an account billing issue. When an external recipient replies to the email 124a, then the reply email 124b will include the same encoded data that was in the outgoing email 124a, without the external recipient necessarily being aware of the presence of the encoded data. The received email 124b can be processed by the email server 120, the encoded data can be extracted, and the server 120 can perform any action based on the encoded data. For example, the email can be routed to an appropriate entity within the organization 110. In the example of FIG. 1, if the encoded data indicates that the original email 124a related to a promotional event, then the server 120 can forward the reply email 124b to the first user 122a (e.g., who may be an entity in charge of public relations within the organization 110), and if the encoded data indicates that the original email 124a related to an account billing issue, then the server 120 can forward the reply email 124b to the second user 122b (e.g., who may be an entity in charge of finance within the organization 110).

In some implementations, entities within the organization 110, such as the first and second users 122a, 122b, may include encoded data in an email header to indicate that the email message should not be forwarded outside of the organization 110. This may be chosen by the entities, for example, if the email message contains information that is confidential to the organization 110. For example, an email message sent by the first user 122a and received by the second user 122b may include encoded data indicating that the email message should not be forwarded outside the organization 110. If the second user 122b subsequently forwards the email message to other entities, and if one of those other entities is outside of the organization 110, then the server 120 can receive the forwarded email message, extract the encoded data, determine that the email message should not be forwarded outside of the organization 110, and block the forwarding of the email message outside of the organization 110.

The extracted data can be used by entities for a variety of purposes, and the system described here is not limited to any particular purpose. The data can be used to indicate that an entity extracting the data should perform any appropriate action upon receiving an email containing the encoded data. Such actions can include, for example, changing a characteristic of one or more email messages, implementing rules for handling one or more email messages, or the data may not relate to email communication at all, and may be used for other purposes. Further examples and explanations are provided below, e.g., in the descriptions of FIGS. 2C, 2D, and 7. The encoded data may also include uses such as cybersecurity training for employees, analysis of secure messages, indication of suspicious messages, internal routing of messages, and message tracking. These examples are non-limiting and explanations are provided below.

Independent of the instructions represented by the encoded data, the system described here can be used to include the encoded data in an email message in such a way that the encoded data is automatically carried over to subsequent replies to and forwards of the email message by other entities, even without the other entities necessarily being aware of the presence of the encoded data. Such a system may enable expanded features and capabilities for users of an email system.

FIGS. 2A-2D illustrate examples of sending, receiving, and extracting data that is encoded in email headers, and taking actions based on the extracted encoded data, according to some implementations. In these examples, an entity's email client that includes and sends encoded data in an email message is also the email client that extracts the encoded data from a subsequent reply email and performs an action based on the extracted encoded data. The sender is only one example of an entity that may extract and use the encoded data, and other entities besides the sender may extract and use the encoded data. For example, if the sender's email message is forwarded to other users, then the encoded data will automatically be included in the forwarded emails, and the email clients of one or more of the users that receive the forwarded emails may extract and process the encoded data to perform actions that were indicated by the original sender.

Figures 2A, 2B, 2C, 2D:
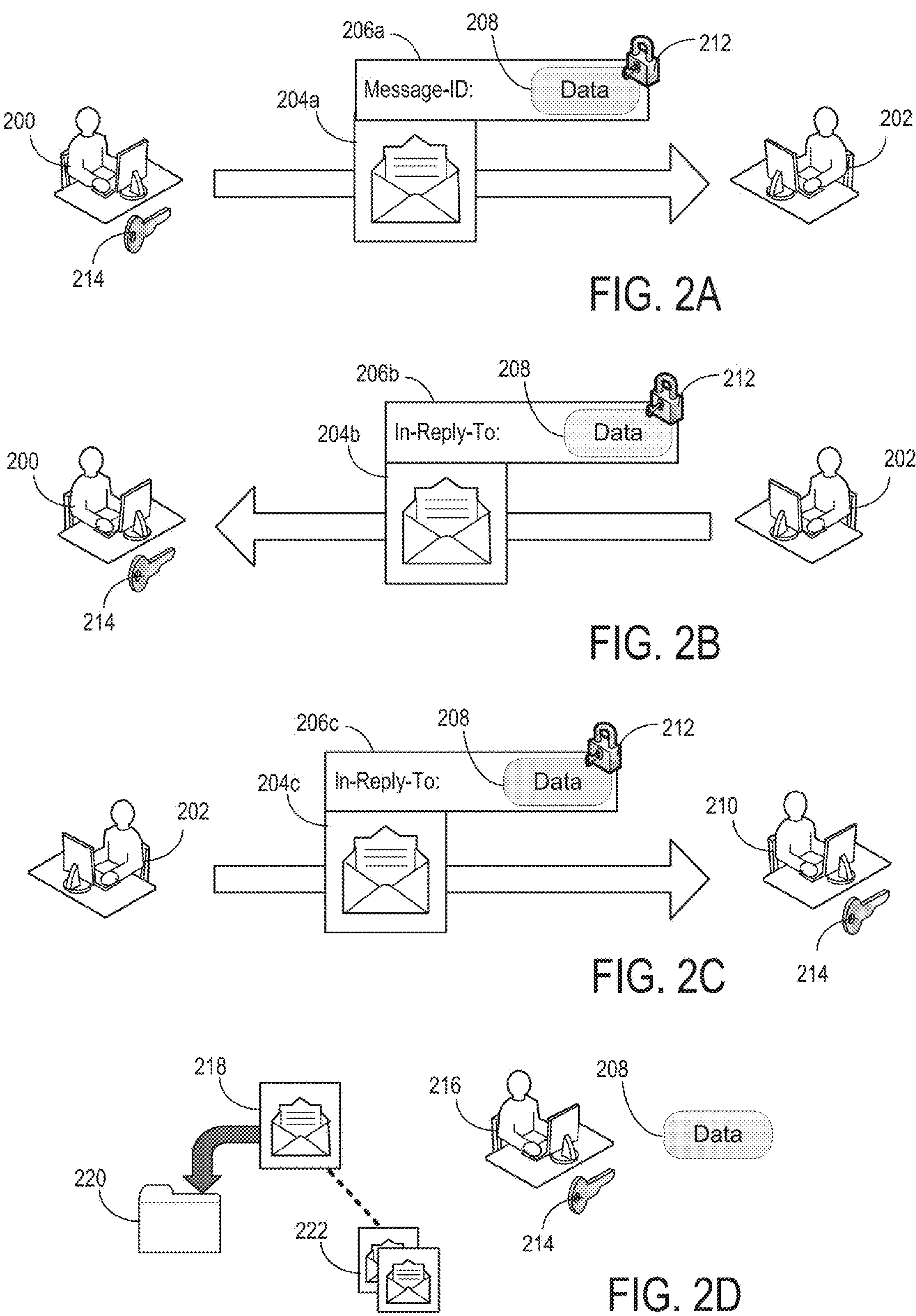

Although the examples in FIGS. 2A-2B are described in the context of including encoded data in the Message-ID and In-Reply-To header fields of an emails message, these techniques are not limited to using these particular header fields. For example, a number of header fields (e.g., header fields such as those defined by the communication standards described above) may be used to persistently carry the encoded data in an email message and subsequent replies to, and forwards of, the email message. Examples of other header fields are provided below in the description of FIGS. 3A-3B.

In FIG. 2A, a first user 200 communicates with a second user 202 via electronic communication, such as a first email message 204*a*. Prior to sending the first email message 204*a*, the first user 200 may select a particular action to be taken when a subsequent reply of the first email message 204*a* is received by the first user 200 from the second user 202. Additionally or alternatively, the action may be taken by the computing system of a third user that receives a subsequent forward of the first email message 204*a* from the second user 202.

In some implementations, the encoded data can be included in a standard header field of an email message by the email client of the first user 200. The encoded data can be included in the standard header field in such a way that replies to and/or forwards of the email message will automatically include the same encoded data in a corresponding header field of the reply/forward email message, even if the replying/forwarding entity is not aware of the presence of the encoded data.

As an example, email systems that conform to IETF-published standards typically have a "Message-ID" field in the header of an email message. The Message-ID field contains a globally unique identifier (e.g., a serial number) for the email message. The contents of the Message-ID field are automatically carried over by IETF-compliant recipient email clients into the "In-Reply-To" field of any reply emails and forward emails of the email message. In this way, email clients can identify email messages belonging to the same thread of conversation.

FIG. 2B illustrates how this feature of IETF-compliant email clients can be utilized by the email client of the first user 200, so that when the first user 200 includes encoded data 208 into the Message-ID field 206*a* of the first email message 204*a* to a second user 202, that encoded data 208 will be automatically returned in the In-Reply-To field, such as In-Reply-To field 206*b*, of a subsequent reply email message, such as second email message 204*b*. The email client of the first user 200 can insert the encoded data 208 into the Message-ID field 206*a* using any one of various insertion techniques, some of which are described below with respect to FIGS. 3A and 3B.

After the second user 202 receives the first email message 204*a* from the first user 200, the entire contents of the Message-ID field 206*a* are automatically extracted by an IETF-compliant email client of the second user 202 and automatically included in the In-Reply-To field 206*b* of the second email message 204*b*, sent by the second user 202. Included in the contents that are automatically included in the In-Reply-To field 206*b* of the second email message 204*b* is the encoded data 208. The transfer of the contents of the Message-ID field 206*a*, including the encoded data 208, from the first email message 204*a* to the In-Reply-To field 206*b* of the second email message 204*b* occurs automatically by the IETF-compliant email client of the second user 202, even if the email client of the second user 202 is unaware of the presence of the encoded data 208. When the first user 200 receives the second email message 204*b*, the email client of the first user 200 can be configured to extract the encoded data 208 from the In-Reply-To-Field 206*b*, and take an appropriate action that is indicated by the encoded data 208.

As another example, FIG. 2C illustrates an example of the encoded data 208 being carried over from the first email message 204*a* to the In-Reply-To field 206*c* of a third email message 204*c*, forwarded by the second user 202 to a third user 210. In this case, the third user 210 may extract and process the encoded data 208 to take an appropriate action indicated by the first user 200. In some implementations, the intermediate forwarding entity, such as the second user 202 (e.g., a computer system and/or email client operated by the second user 202), need not necessarily be aware of the presence of the encoded data 208 that was forwarded to the third user 210.

Therefore, the first user 200 may include encoded data 208 (e.g., data beyond simply identifying the message, such as data indicating an action to be carried out) in the Message-ID field 206*a* of the first email message 204*a*, and the encoded data 208 will be automatically be extracted by an email client of the recipient (e.g., second user 202) and copied into the In-Reply-To field of subsequent reply and/or forward email messages (e.g., the In-Reply-To field 206*b* of the second email message 204*b* in FIG. 2B, or the In-Reply-To field 206*c* of the third email message 204*c* in FIG. 2C).

In some implementations, an email message header field, such as Message-ID field 206*a*, can further include mechanisms to secure encoded data, e.g., the encoded data 208. Such security mechanisms may be used to prevent re-use of Message-ID headers to perform undesired actions. In some implementations, systems can use an encryption scheme to ensure that an email message header field, such as Message-ID field 206*a*, cannot be modified without destroying the encoded data. In some implementations, systems can embed certain validation information in the message header field so that the header field is only valid when sent to an authorized entity. For example, the Message-ID field 206*a* can contain a security mechanism, such as an electronic signature 212, that ties the encoded data 208 to an identifying mechanism, such as a key 214, belonging to an authorized recipient of the encoded data 208, such as the first user 200 (in FIG. 2B) or the third user 210 (in FIG. 2C) or any other intended recipient of the encoded data 208.

In some implementations, the encoded data is secured by homomorphic encryption. By utilizing homomorphic encryption, a third party receiving the electronic message is able to manipulate/interact with the encoded data without decrypting the encoded data. The resulting data is also encrypted, preventing reverse engineering of the encoded data. Thus, the encoded data is secure but a third party may still utilize the encoded data. For example, receipt information may be homomorphically encrypted in order to search for receipt data within the encoded data. Utilizing encoded data in this way reduces reliance on archives and allows for an archive-less search.

In this way, the encoded data 208 can be automatically and securely extracted and replicated by email systems, even systems that may not be configured to process, nor even to be aware of, the encoded data that is included in the header fields of the email message. By using existing header fields of email messages and existing mechanisms that automatically extract and relay information contained in those header fields, the need for customized solutions may be reduced, resulting in a simplified and scalable system. Moreover, by enabling secure and confidential transport of encoded data within email header fields, the encoded data can, in some implementations, be detailed enough to uniquely define an action to be carried out by the extracting entity. In some examples, the encoded data can define a particular context in which the action is to be carried out. In some implementations, such techniques may not necessarily require additional databases, servers, or other components to store additional information to interpret the encoded data. In some implementations, some state information may be stored and retrieved by entities, for example, to assist in interpreting the encoded data and performing the intended instruction.

FIG. 2D illustrates examples of different actions that can be enabled by the encoded data 208 that is extracted by an authorized user 216 (e.g., the first user 200 in FIG. 2B or the third user 210 in FIG. 2C), from the In-Reply-To field 206*b* of a reply/forward email message 218 (e.g., the second email message 204*b* in FIG. 2B or the third email message 204*c* in FIG. 2C) containing the encoded data 208 that is received by the authorized user 216. For example, the authorized user 216 may want the reply/forward email message 218 to be placed in a certain folder, such as folder 220, in an email archive. Information identifying the folder 220 can be embedded in the encoded data 208 in a header field of the email message 218, so that an email client of the authorized user 216 can be configured to extract and process the encoded data 208 to automatically place the received email 218 in the folder 220.

As another example, the authorized user 216 (e.g., the first user 200 in FIG. 2B or the third user 210 in FIG. 2C) can use the encoded data 208 to automatically relate the received email message 218 (e.g., the second email message 204*b* in FIG. 2B or the third email message 204*c* in FIG. 2C) to one or more other email messages that were previously sent and/or received by the authorized user 216. If the authorized user 216 sends a series of related emails to one or more recipients, then the authorized user 216 may wish to group and match the related emails together. Furthermore, if one or more of the recipients respond, then the authorized user 216 may want to match the replies together and/or match the replies against other related emails. Using the techniques described here, the authorized user 216 can include identifying information in the encoded data 208 to allow tracking these apparently independent emails together. In addition to using standard message header fields (e.g., Message-ID, In-Reply-To, Subject, etc.) to group and track threads of emails, such techniques can group together related emails from different threads and perform common actions on those related emails (e.g., filing the related emails in a common directly, or tagging the related emails with a common tag, etc.) A client and server can be configured to implement these techniques; for example, the client and/or server could automatically group the related emails in a way that may not be otherwise possible without human effort, which may be prone to errors. The configured client and/or server would be able to match the replies from any of the related emails together and provide a richer set of features. In this way, the techniques described here can be used to match not only clearly-related emails (e.g., replies and forwards of emails), but also to match emails that are less-obviously related, such as emails for a common topic, client, or work product.

As another example, encoded data may be used for cybersecurity training for employees of an organization. Current training messages send text emails with links as a lure for users to click on. Using encoded data allows a test to track user responses to an email. For example, encoded data allows tracking of the fact that the email is a training email. Any forwards, replies, or other interactions with the training email can be detected using encoded data and alert that the user failed the training exercise.

As another example, encoded data may be used in secure messaging. Encoded data may positively identify a message as a secure message and allow all replies and forwards to be treated as secure messages as well.

As another example, encoded data may be used to indicate a suspicious message. Encoded data may save receipt decisions for messages, including sender reputation or a possible impersonation. The system may then take appropriate action on the secure message on all replies, forwards, and other actions on the message. This is similar to the training example, but in a non-training setting.

As another example, encoded data may be used to internally route messages. For example, by recording receipt information, internal emails may be routed more efficiently. A message containing personally identifiable information (PII) encoded in the message may be handled appropriately, such as by being forwarded to the appropriate recipient, a warning could be added to the message, or the message could be blocked due to compliance issues such as with the General Data Protection Regulation (GDPR) in Europe or other internal or legal compliance regulations.

As another example, encoded data may be used to track message dissemination. Encoded data can be used to track replies, forwards, CC's etc. and track how the message and its information is spread. This can be especially useful in situations where the message contains PII or other sensitive information such as health or financial information. By using encoded data, this information can be traced and accounted for to ensure it is being handled/disseminated properly.

As another example, encoded data may be used with active messages. Active messages are a type of inter-process in which a computer program's subroutine or function can be executed by a different computer than where it resides. Encoded data in an active message is able to, for instance, track the execution of the executed function and the results of execution. This information may be relayed back to the original sender or otherwise utilized. Other applications with active messages are possible.

The examples described here are of possible uses of the techniques described herein. In general, data that is encoded in email message headers, such as the encoded data 208 shown in FIGS. 2A-2D, can be used to embed any information or action (e.g., action to be executed by a computer system) into the email message. The information or action can take any form, e.g., can be chosen by entities that include the encoded data into email messages, such that the action is automatically performed by an authorized entity that extracts the encoded data. Encoded information may include receipt metadata, receipt decisions, receipt entities such as personally identifiable information (PII) or financial information, and/or receipt hashes. Other examples of actions that may be encoded are presented below in the description of FIG. 7.

Figure 3A:
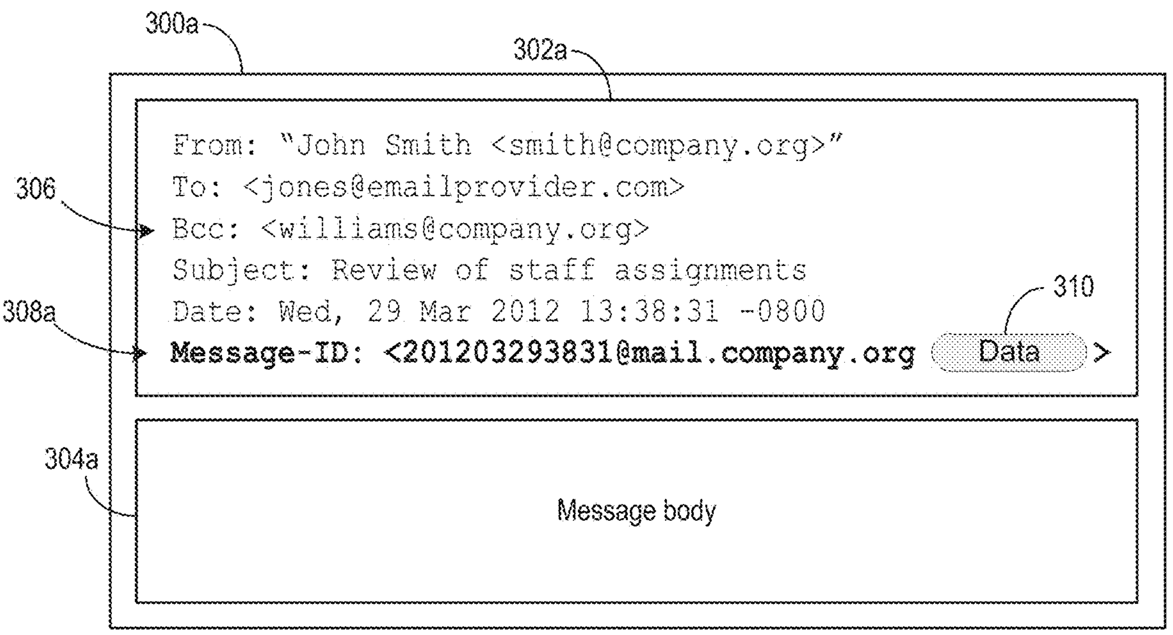
Figure 3B:
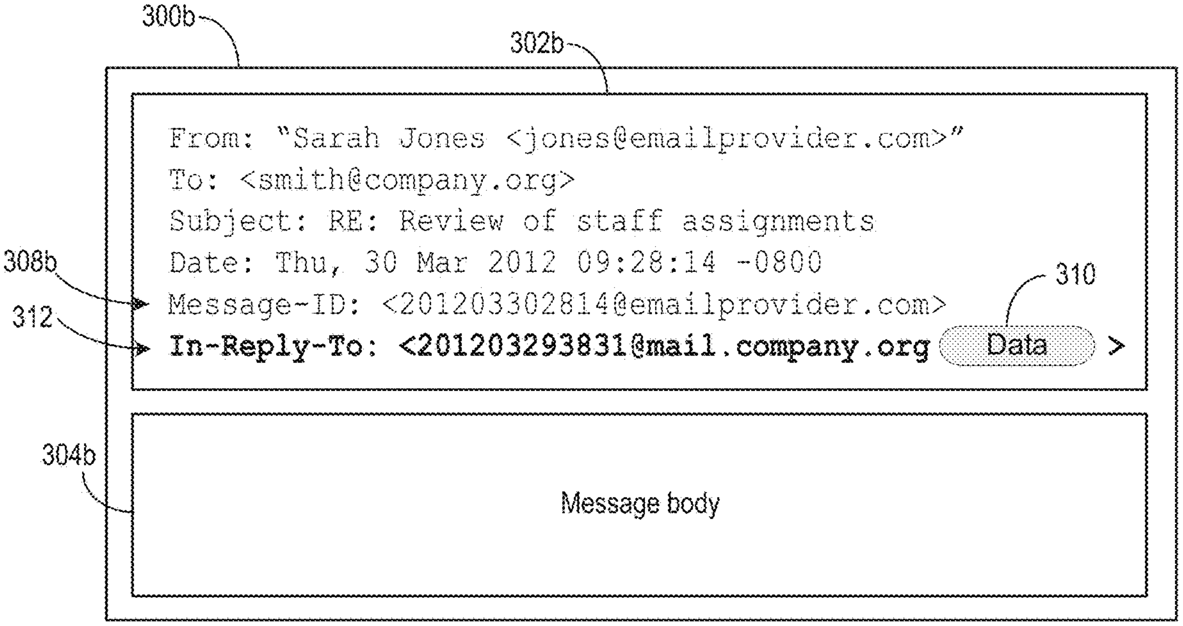

FIGS. 3A and 3B illustrate examples of email message headers that include encoded data, according to some implementations. An electronic communication typically includes multiple portions of information. Some portions of the electronic communication may be used for carrying information to be communicated to other entities, while other portions of the electronic communication may be used for carrying information related to the control and routing of the electronic communication.

For example, an email message, such as a first email message 300*a* in FIG. 3A and a second email message 300*b* in FIG. 3B, consists of a message header, such as first and second message headers 302*a* and 302*b*, and a message body, such as first and second message bodies 304*a* and 304*b*. The first and second message bodies 304*a* and 304*b* typically contain information that is to be communicated between entities, and the first and second message headers 302*a* and 302*b* typically contain control information for routing and handling the email messages. The first and second email messages 300*a* and 300*b* may also have various attachments to the email messages and/or in-line objects embedded within the email messages.

The first and second email message headers 302*a* and 302*b* contain various header fields that define control information, such as "From" and "To" fields that contain originator and recipient email addresses, respectively, a "Date" field that contains a date/time stamp, and a "Subject" field that contains a subject of the email message. In addition, the first email message header 302*a* may contain a "Bcc" field indicating one or more entities to whom the first email message 300*a* should be sent as a "blind carbon copy," e.g., without indicating to other recipients that those one or more entities were copied.

The first and second email message headers 302*a* and 302*b* also have first and second Message-ID fields 308*a* and 308*b*, respectively, which uniquely identify the first and second email messages 300*a* and 300*b*. In general, the first and second email message headers 302*a* and 302*b* may also have other fields not shown in FIGS. 3A and 3B, such as message originator header fields (e.g., "From," "Resent-From," "Reply-To"), or message recipient header fields (e.g., "To," "Cc," "Bcc," "Resent-To," "Resent-Cc," "Resent-Bcc"), or message-id related header fields (e.g., "Message-ID," "In-Reply-To," "References"). Techniques described herein can be used to include encoded data, such as encoded data 310, into any appropriate message header field, such as the first Message-ID field 308*a*, such that the encoded data 310 is automatically included in a header field of a reply/forward email message, such as the In-Reply-To field 312 of the second email message 300*b*.

Although the examples in FIGS. 3A and 3B show the encoded data 310 being included in the first Message-ID field 308*a* of the first email message 300*a*, and in the In-Reply-To field 312 in the second message header 302*b* of the second email message 300*b*, implementation are not limited to using these particular fields, as any of the above-listed header fields may be appropriately used to carry the encoded data 310 in a persistent manner between an email message and replies/forwards of the email message.

The encoded data 310 can be included in the header fields in any manner. In some implementations, if the encoded data is included in a field normally reserved for email addresses (e.g., From, Reply-To, Resent-From, To, CC, BCC, Resent-To, Resent-CC, etc.), then in the local part of the email address, one or more separating characters (e.g., a "+" symbol or other suitable separating character(s)) could be used to separate the actual delivery email address from the encoded data, such as encoded data 310. For example, an email message with a "To" header field specifying "nsb+data@company.org" would be routed to the email address "nsb@company.org," but the "data" part would be available for extracting and processing by authorized entities to perform the specified action. In some implementations, if the encoded data is include in non-addressing header fields (e.g., Message-ID or In-Reply-To) then one or more separating characters (e.g., a "+" symbol) could also be used to separate the encoded data from other information in the header fields.

The particular format of the encoded data, such as encoded data 310, can be any format used to encode data. For example, a base64 encoding of compressed and encrypted JavaScript Object Notation (JSON) could be used. But any format of the encoded data 310 could be used, for example, Extensible Markup Language (XML), a serialized Java objects, raw bytes, etc. An encoding, such as a base64 encoding, could be used to convert the information in the encoded data 310 from binary format to a format that RFC-compliant systems can recognize. In some implementations, compression could be used to achieve compactness of the encoded data 310, but may not be necessary, for example, if the encoded data 310 is small. In some implementations, the encoded data 310 could be encrypted to make it secure, though this may not be necessary if the encoded data 310 is not confidential.

Any type of data (and associated action) can be encoded and included in email message headers. As examples, the encoded data could indicate an automated action. For example, the encoded data could indicate an action to be performed when the message is replied to. In this example, the sender of the message could tell the recipient, "if you want to perform action X, then just reply to this email message." As another example of an automated action, the encoded data could indicate that when an associated thread of messages has been completed (e.g., after an amount of time has elapsed since the most recent message in the thread), a particular individual could be notified. As another example, the encoded data could indicate a selective distribution of the email message (e.g., user 2 attempts to forward an email message to user 3, but the encoded data in the email message instructs user 2's email client/server not to deliver to user 3). As another example, the encoded data could indicate selective arrival notification (e.g., if a recipient of an email message forwards the email message to another user, then the original sender of the email message is notified). As another example, the encoded data could indicate instructions related to certain aspects of a user's computing environment (e.g., if user 1 sends an email message to user 2, when user 2 reads the email message, then user 2's email client/server could automatically open applications (e.g., documents, web pages, etc.) that were open on user 1's screen and that user 2 is allowed to see). As yet another example, the encoded data could include whitelisting information. For example, user 1 could specify authentication information, e.g., listed on user 1's business card or in a public directory of authentication information, that, when included in encoded data that is included in an email message sent to user 1, indicates that the email message should be accepted by an email client/server of user 1. In this example, an email server that receives messages sent to user 1 can filter incoming messages based on the presence of the authentication information.

Regardless of the exact nature of the encoded data, or the specific way in which the encoded data is included in an email message header, an entity can have the encoded data included in an outgoing email, in such a way that the encoded data is automatically included in subsequent emails that are in reply to, or forwards of, the outgoing email. In some implementations, the encoded data can be included in an email message in such a way that even if the receiving entity's email client or server is not explicitly aware of the presence of the encoded data, the encoded data is nonetheless automatically extracted by the client or server and included in subsequent replies to and/or forwards of the email message.

The encoded data may be defined by a person, an email client, an email server, or any other entity. In some implementations, the encoded data can be encrypted to prevent unauthorized access to the data, even by entities that receive and handle email messages containing the encoded data. For example, the encoded data can be encrypted so that the encoded data is only interpretable by the sender of the original message, or by one or more of the recipients of email messages that are replies to and/or forwards of the original message. In such a way, the encoded data can include confidential information that can be securely sent, returned, and forwarded among different entities. The encoded data may also be homomorphically encrypted so that the encoded data may be manipulated by the user without needing to be decrypted. Homomorphic encryption keeps encoded data secure while allowing the encoded data and the message to be sent, returned, forwarded, and otherwise acted upon without the user decrypting the encoded data.

Figure 4:
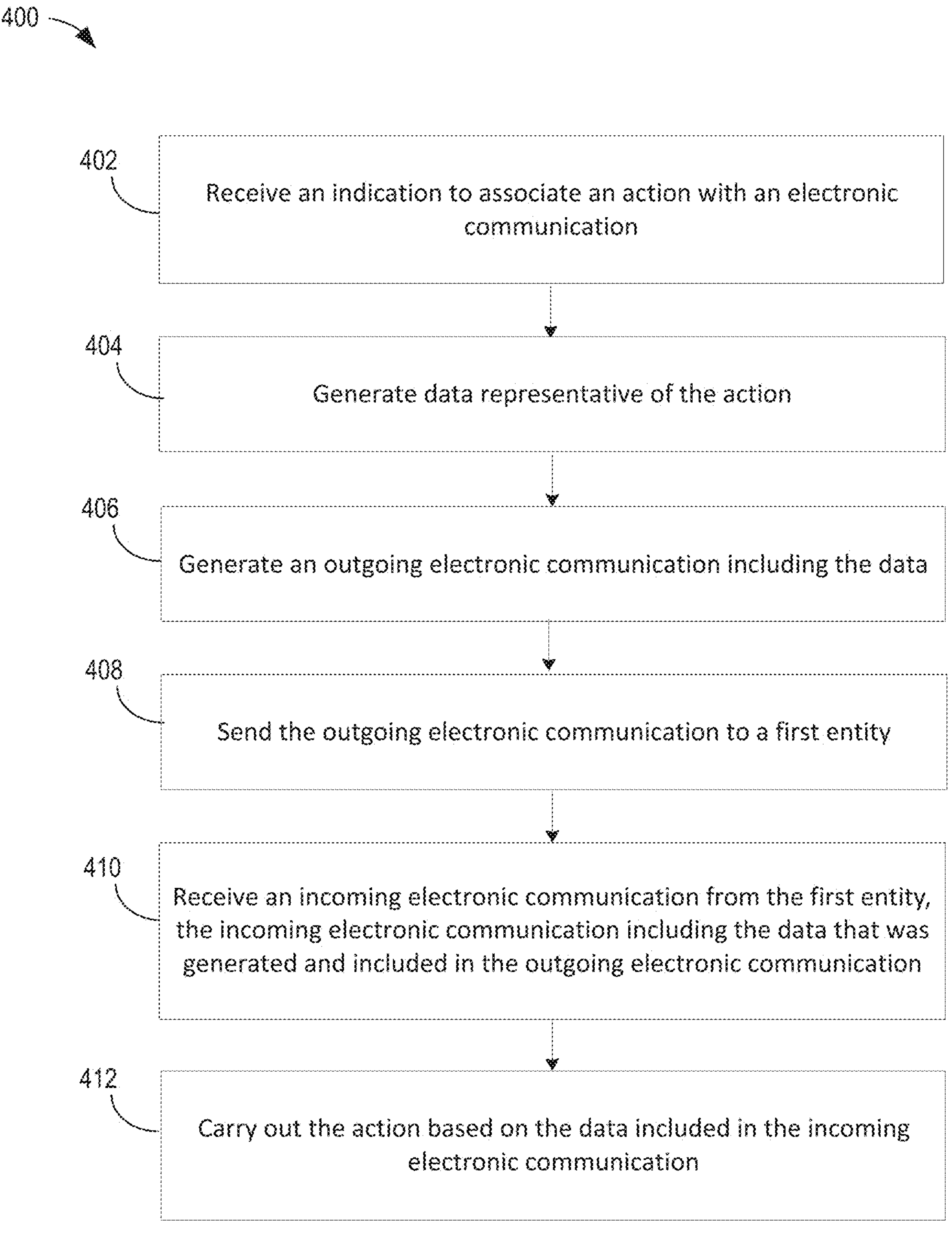
FIGS. 4, 5 and 6 are flow charts.
Figure 5:
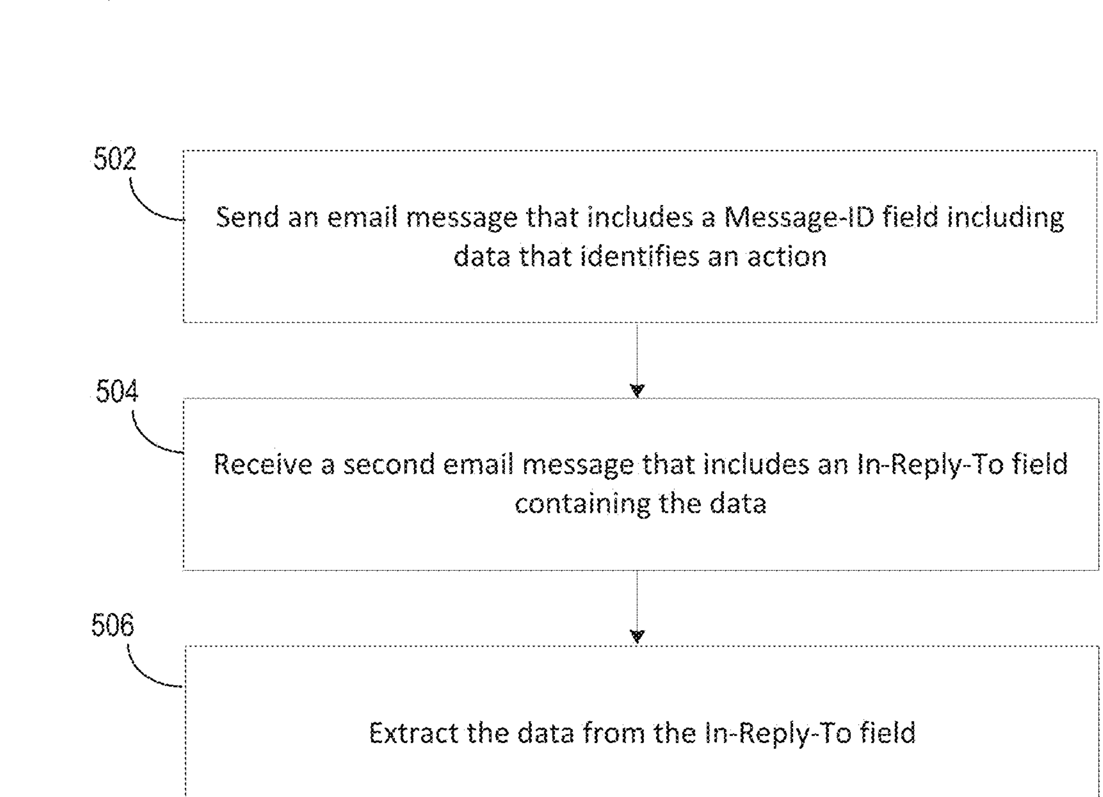
Figure 6:
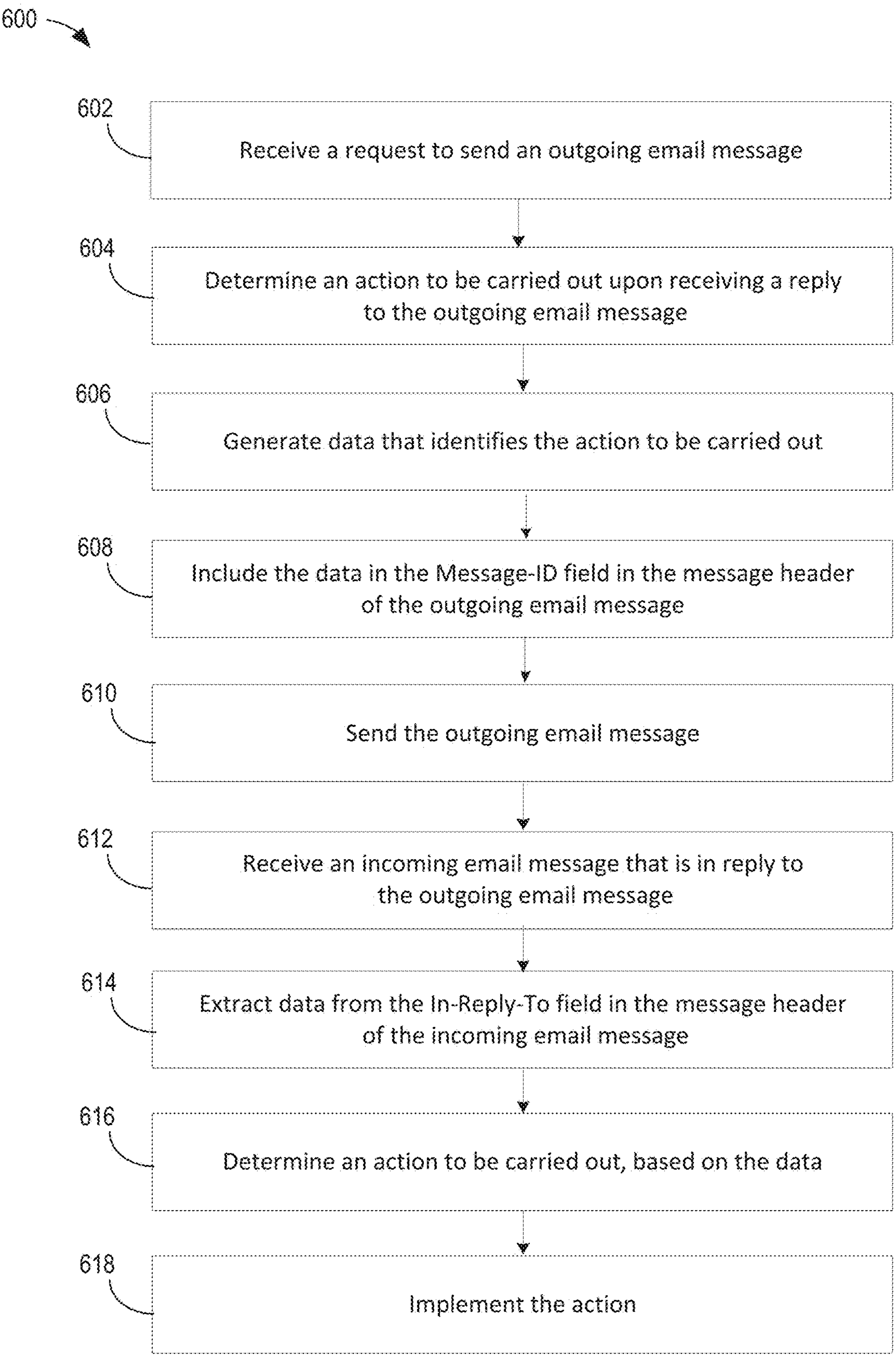

FIGS. 4-6 are flowcharts of examples of processes of encoding, sending, and extracting encoded data from electronic communications. Although the examples in FIGS. 4-6 illustrate certain scenarios, e.g., of an entity sending the encoded data and subsequently receiving back the encoded data in a reply (e.g., the second email message 204*b* in FIG. 2B), implementations are not limited to the encoded data being included in, and/or extracted from, replies. In some implementations, the encoded data may be relayed in forwarded emails that are forwards of the original electronic communication (e.g., the third email message 204*c* in FIG. 2C), and the encoded data may be extracted by an entity different than the original sender (e.g., the third user 210 in FIG. 2C) to perform the action represented by the encoded data.

FIG. 4 is a flowchart of an example process 400 of associating an encoded data with an action, including the encoded data into an outgoing electronic communication, receiving the encoded data back in an incoming electronic communication, and carrying out the action indicated by the encoded data. For example, the process 400 could be carried out by an email client (e.g., an email client in computing system 114 operated by user 102 of FIG. 1) or an email server (e.g., email server 120 of FIG. 1).

An email client of an entity (e.g., the first user 200 in FIGS. 2A-2B) receives 402 an indication to associate an action with an outgoing electronic communication (e.g., the first email message 204*a* in FIG. 2A). The indication may be received by any technique, such as receiving an input selection from the user.

The indicated action may be represented by generating 404 encoded data (e.g., the encoded data 208 in FIGS. 2A-2D or the encoded data 310 in FIGS. 3A-3B). The encoded data may be generated by any technique, some examples of which were provided above in the descriptions of FIGS. 3A-3B.

The encoded data that represents the action may be included in an outgoing electronic communication that is generated 406 by the email client. The encoded data may be included in the outgoing electronic communication by any technique, such as including the encoded data in a message header field (e.g., the first message header field 302*a* in FIG. 3A).

The email client may send the outgoing electronic communication, with the encoded data, to a first entity (e.g., the second user 202 in FIGS. 2A-2D). The email client of the sending entity may then receive 410 an incoming electronic communication (e.g., the second email message 204*b* in FIG. 2B) from the first entity. The incoming electronic communication may, in some implementations, be a reply to the outgoing electronic communication, and may contain the same encoded data that was included in the outgoing electronic communication.

The email client may carry out 412 the action indicated by the encoded data that was included in the incoming electronic communication and that was extracted from the incoming electronic communication. Some examples of actions that may be carried out are described above in the description of FIG. 2D, and other examples are described below in the description of FIG. 7.

FIG. 5 is a flowchart of an example process 500 of using particular email header fields, such as the Message-ID and In-Reply-To fields, to carry encoded data (e.g., the encoded data 208 in FIGS. 2A-2D or the encoded data 310 in FIGS. 3A-3B). An email client of an entity (e.g., the first user 200 in FIGS. 2A-2D) may send 502 a first email message that has a Message-ID field (e.g., the first Message-ID field 308*a* in FIG. 3A) that includes encoded data representing an identified action. The encoded data could be included in the Message-ID field in any manner by the email client, for example using techniques described above in the description of FIG. 3B.

The email client receives 504 a second email message, which is a reply to the first email message, that has an In-Reply-To field (e.g., the In-Reply-To field 312 of the second email message 300*b* in FIG. 3B) that includes the encoded data that was sent in the first email message. The email client can extract 506 the encoded data from the In-Reply-To field of the second email message.

Implementations are not limited to using the Message-ID and In-Reply-To fields of email message headers, as any of a number of header fields may be used, some examples of which were given above in the description of FIGS. 3A-3B.

FIG. 6 is a flowchart of an example process 600 of an email client of a user (e.g., the first user 200 in FIGS. 2A-2D) including encoded data into header fields of an email message, receiving the encoded data back in a reply email, and extracting the encoded data to perform an action, according to some implementations. The email client receives 602 a request from the user to send an outgoing email message (e.g., the first email message 204*a* in FIG. 2A). The email client determines 604 an action to be carried out upon receiving a reply to the outgoing email message. The action may be determined by any technique, e.g., receiving an input from the user. The email client generates 606 encoded data that identifies the action to be carried out, e.g., in a particular context in which the action is to be carried out. For example, the context may correspond to an email client or server receiving an incoming email message that is in reply to an outgoing email message that the email client or server had previously sent. As another example, the context may correspond to an email client or server receiving an email message that was previously sent by another email client or server. The encoded data may be generated by any technique, for example using techniques described above in relation to FIGS. 3A-3B.

The email client can include 608 the generated encoded data into one or more header fields, such as the Message-ID field (e.g., the first Message-ID field 308*a* of the first email message 300*a* in FIG. 3A), in the message header of the outgoing email message, send 610 the outgoing email message. When the email client receives 612 an incoming email message (e.g., the second email message 204*b* in FIG. 2B) that is in reply to the outgoing email message, then the email client may extract 614 the encoded data from the In-Reply-To field (e.g., the In-Reply-To field 312 of the second email message 300*b* in FIG. 3B) in the message header of the incoming email message. In some implementations, the encoded data may have been automatically included in the In-Reply-To field of the incoming email message by an email client of another entity (e.g., the second user 202 in FIGS. 2A-2B) that replied to the outgoing email message containing the encoded data.

The sender's email client may determine 616 an action to be carried out, based on the encoded data that was extracted from the incoming email message. In some implementations, the action may be determined based only on the encoded data, such that the system is stateless, in the sense that the system may not need to store persistent state information that is needed in order to translate the encoded data into the action. In some implementations, some state information may be stored between email messages by the email client or server to assist in processing and interpreting the encoded data extracted from incoming email messages. Regardless of the manner in which the email client determines an action to be carried out based on the encoded data, the email client may implement 618 the action. Examples of actions that may be represented by the encoded data and implemented by the email client are described with respect to FIG. 7.

Figure 7:
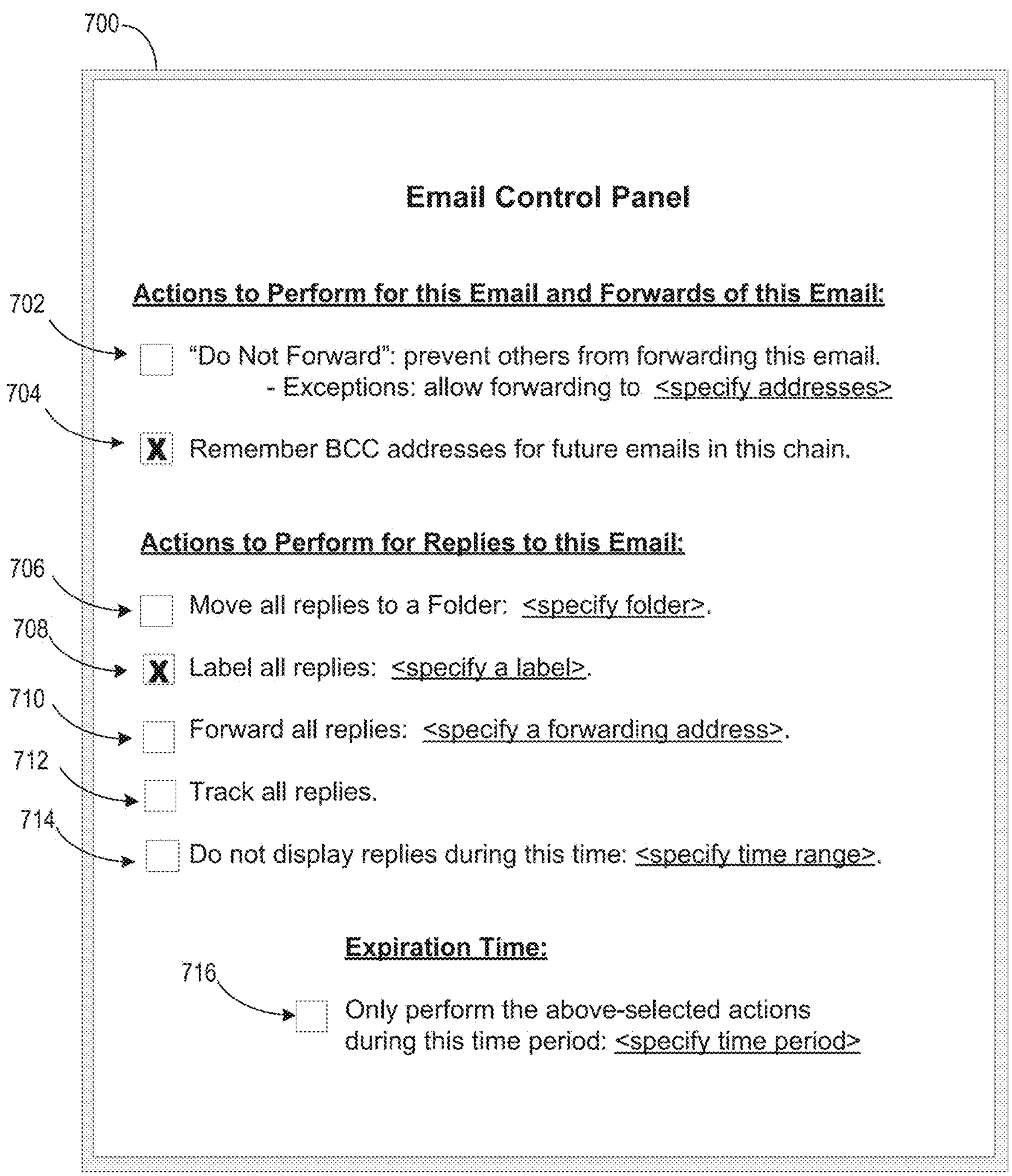
FIG. 7 is a sketch of an example of a user interface.

FIG. 7 shows a user interface 700 for selecting an action to be encoded in an email message header (e.g., the first email message header 302*a* in FIG. 3A). Other actions could be included besides those shown in FIG. 7. A user may be able to select one or more actions to be represented by the encoded data in an email message, so that the encoded data can be automatically relayed in subsequent replies and/or forwards of the email message to enable authorized entities to extract and perform the one or more actions.

For example, the user may select action 702 to prevent the email message from being forwarded to entities outside of a designated group of entities (e.g., organization 110 in FIG. 1). In some implementations, the encoded data may include a "non-disclosure" flag that could be detected on forward by a gateway (e.g., server 120 in FIG. 1). If the user of the user interface 700 sets this "non-disclosure" flag in the encoded data that is included in the Message-ID, for example, then any unauthorized forwards of the email message to entities outside of the organization may be detected and blocked by the gateway, based on the flag.

As another example, the user may select action 704 to retain information about recipients who are identified in the "Bcc" field of the email message, so that the same recipients can be included in the "Bcc" field of subsequent emails that the user sends in the same email thread (e.g., emails that are related as being replies or forwards of each other). In some implementations, to avoid undoing the privacy effects of using the Bcc field, the email message header could indicate encrypted code names that can be translated, by the email client of the user of interface 700 (or any other authorized entity extracting the encoded data), into the identities of the Bcc recipients. As such, when the user (e.g., the first user 200 in FIGS. 2A-2D) receives a reply (e.g., the second email message 204*b*) to an outgoing email message (e.g., the first email message 204*a*) that had one or more recipients indicated in the Bcc header field, and the user composes a third email message in the email chain, then the third email message can include the same recipients that were indicated in the Bcc field of the original email message (e.g., the first email message 204*a*). For example, the email client operated by the user can extract the recipients from the encoded data and include them in the Bcc field of the third email message.

The techniques described here may be used in other ways in the context of sending and replying to emails that have Bcc (blind carbon copy) recipients. For example, user 1 sends a first email message to user 2 and user 3, and also includes user 4 in the Bcc field of the first email message. Using techniques described here, user 1 could specify that the Bcc information of user 3 should be encoded and included in the header of the first email message. User 2 may reply to the first email message by specifying a "Reply to All" function that sends user 2's reply to all recipients of the first email message. In some implementations, user 2's email client or server could extract the encoded data from the first email message, determine that user 4 was a Bcc recipient (without necessarily informing user 2 or other users of this fact to retain the anonymity of user 4) and automatically include user 4 in the reply, again as a Bcc recipient. As such, user 4 becomes party to the whole conversation between user 1 and user 2, but is not visible to other parties of the conversation (i.e., users 2 and 3). In some implementations, should user 4, as a Bcc recipient, reply to the first email message, then user 4's reply email message would go to user 1, as well as users 2 and 3, and hence could make users 2 and 3 aware of the fact that user 4 was a Bcc recipient of the first email message. In some implementations, user 4's email client or server could detect that user 4 is attempting to reply as a Bcc recipient and could either indicate a warning to user 4 or could stop the delivery of user 4's reply.

As another example, the user may select action 706 to automatically move all replies to a designated folder, or action 708 to automatically label all replies with a designated label, or action 710 to automatically forward all replies to a designated email address. These designations can be encoded in the email message headers of the outgoing email message, and the encoded data will automatically be preserved in any subsequent replies, at which point the user's email client can extract the encoded data and perform the designated action. This may reduce the need for the user to manually establish filters or other rules-based configurations to perform actions on received emails, and instead the user can specify, directly in the outgoing email message, any actions that should be taken on subsequent replies to that email message.

As another example, the user can select action 712 to track email responses. If the user sends an email with action 712 selected, then upon receiving a reply to the email, the user's email client can extract the encoded data from the email header to automatically locate the previously sent email message in the user's email archive, and then mark that original email message as "reply received." The encoded data could include, for example, a direct pointer to the original email message. For example, if an email client accesses one or more data stores (whether local or remote to the email client) that retain email messages that were previously sent and received by the email client, then a data structure could be configured to include pointers in the form of addresses of memory locations within the one or more data stores in which the email messages are stored. In some implementations, the user's email client can be configured to detect any previously sent messages that have not yet had a reply received, and flag these to the user. This could reduce the need for a user to manually search for previously sent emails that have not been replied to, as the email client could automatically locate previously sent emails using the direct pointer in the extracted encoded data, and categorize those sent emails.

As another example, the user may select an action 714 to indicate a particular range of times at which to display (or not display) a reply to the email. For example, the user may not want to see any replies for certain periods of hours or days (such as evenings or weekends). Other variations might include time limited actions, such as an action 716 in which the user can specify that one or more actions selected for the message are only valid for a specified period of time, outside of which the actions are not performed.

Other examples could include application of certain server-side policies, such as marking a message as high priority (possibly regardless of what the reply specified), and/or preservation of any special tagging mechanism that the sending server might have.

Another application could be in list servers or social sites, in which a single generic email address may be used to handle multiple different types of communications. The type of communication could be encoded in the email message header so that a single email address can be used for actions like member confirmation, moderation, or to indicate that the message is of a certain type (e.g., for routing or archival purposes, etc.). Such a technique could also enable anonymous emailing, in which replies to a single email address can be selectively routed to different people based on the encoded data received in the reply emails.

As another example, encoded data that is included in the header of an email message could include data from portions of the email message itself, such as the subject of the message (e.g., from the "Subject" header field), data from the body of the message, or any portion of the email message. Such information could be used by a sender user of an email message to detect any changes that were made in those portions of the first email message by a replying user. This can improve an email client's ability to group related email messages into common threads despite edits to the subject line by replying users, and/or to detect changes made by replying users to the text of sent email messages.

For example, suppose that a first user (e.g., the first user 200 in FIGS. 2A-2B) emails to a second user (e.g., the second user 202 in FIGS. 2A-2B) a first message (e.g., the first message 204*a* in FIG. 2A) that has a subject "Report," and the second user sends a reply message (e.g., the second message 204*b* in FIG. 2B) with an edited subject, "Report-revised." Typically, the first user's email client may not recognize that the second message is related to the first message, and may create a new conversation thread for the second message. But by including information indicating the subject of the first email message (e.g., the entire text "Report" from the subject field, or a hash of the subject field, or a compressed version of the subject field, etc.) into the encoded data of the first message header (e.g., the encoded data 208 in FIG. 2A), the first user's email client can automatically receive back the subject information of the first message in the encoded data of the second message (e.g., the encoded data 208 of FIG. 2B). As such, the first user's email client can recognize that the second message belongs to the same conversation thread as the first message, by matching the information about the subject "Report" in the encoded data of the received second message with subject lines of previously sent messages.

In general, the encoded data could include information indicating any portion of the first email message, such as the subject of the message, the body of the message, etc. In some implementations, the encoded portions of a first message may be used to help recognize that the first message belongs to the same thread as a second message, even if changes were made to those portions.

As another example, the encoded data that is included in an email message header could include information related to some portions, or the entirety, of the body of the email message. When a first user sends such encoded data in a first message to a second user and receives, in reply, a second message containing the same encoded data, then an email client operated by the first user may extract the information related to the body of the first email message. This feature may be used for any number of purposes. For example, if the second user's email client embeds the body of the first email message within the body of the second message (e.g., by utilizing a function such as "Include Original Message in Reply"), then the first user's email client may use the information related to the body of the first email message extracted from the encoded data, and compare it with the body of the first message that is embedded in the body of the second message, to assist in grouping related email messages into a common thread, despite possible changes in subject line.

Email clients and/or servers could use any technique to include portions of the email message into the encoded data. For example, a hash function (e.g., a Secure Hash Algorithm (SHA) such as SHA-256), or other mapping, may be applied to the portions of the email message to generate a representation for the entire message or parts of the message. The result of the hash function can be included in the encoded data. As another example, a digital signature of the portions of the email message may be generated. The digital signature may be included in the message header and may be accessible by an entity that possesses a credential, such as a public key of a public/private key pair. In some implementations, the information that represents portions of the email message may be included separately from other encoded data that is included in the message header. For example, some or all of the information that represents portions of the email message could be included in a particular field of the header, as is done with the "DKIM-Signature:" field for a DomainKeys Identified Mail (DKIM) signature.

In some implementations, encoded data that includes portions of the email message (e.g., as a result of a hash function) could be used to facilitate access to the portions of the email message. For example, if user 1 sends an attachment to user 2 and the user 2 replies, then the encoded data could be used to contain a reference to the original attachment (e.g., a hash function of the attachment) so that user 1 can determine which version of the attachment user 2 is replying to. In some implementations, the encoded data may include the Content-ID header field or the Message-ID header field of the email message that included the attachment, either additionally or alternatively to including a hash function of the attachment.

But independent of the choice of the specific technique used, one or more portions of an email message can be encoded and included in a header of the email message. The encoded portions of the email message could be used for any purposes, some examples of which are described above. As another example, the encoded portions of an email message could be used by an appropriately configured email client or email server that sends an email message to determine whether the email message was received at a recipient unchanged. This could be used, for example, to inform the sending email client or server that the recipient received the message that it was expected to receive.

As other examples, the encoded portions of the email message could be used to determine information about scenarios in which email messages are autoresponded-to and/or bounced. This could be used, for example, in enhanced loop detection and/or bounce detection.

In some implementations, improved bounce-handling could be implemented using the techniques described here. If an email message Delivery Status Notification (DSN) is returned to a sending user and the DSN contains encoded data that was included in the original email message (e.g., in the original Message-ID header field), then the user's email client or server could extract the encoded data out of the DSN and perform appropriate bounce handling. For example, in the context of a list server that operates a mailing list, rather than having a specific email address that applies to all bounced email messages in a list, techniques described here could be used to allow email messages to be sent with different bounce handling options. Examples of such bounce-handling options include dropping the bounced email message, forwarding the bounced email message to a special email address, or removing a member associated with the bounced email address. In some implementations, such options could be achieved with special bounce email addresses such as "list-bounce." In some implementations, a list server could send normal list email messages with a "drop from mailing list" bounce action but could send certain email messages (e.g., membership confirm email messages) with a "remove member" bounce action. As such, a list server could implement different types of bounce detection actions for different types of email messages to handle bounced emails differently depending on the type of email message that was sent.

In some implementations, improved loop detection could be implemented using the techniques described here. Such email loops may occur, for example, as a result of two email clients and/or email servers automatically sending email messages (e.g., as auto-replies or bounced email messages) to each other, creating ongoing replies of email messages. Such email loops could be detected by including, in email message headers, encoded data that indicates loop-detection information, such as a count of the number of received email headers, or an identifier (e.g., an internet protocol (IP) address) for the other email client/server. For example, this may be used in addition or as an alternative to using the Message-ID to identify such repeated loops.

In some implementations, the encoded data may be controlled in a similar fashion to hypertext transfer protocol (HTTP) cookies, or web cookies. Web cookies allow web servers to store information on a user's device or to track user activity in a browser. As with HTTP cookies, encoded data in a message may be shared with domains and/or third-party cookies in order to track message activity. By sharing encoded data with third-party or domain cookies, users may track message activity across message clients as well as websites. Additionally, as with HTTP cookies, encoded message data may also be blocked and/or stripped from messages. For example, encoded data may only be relevant internal to an organization. In this case, encoded data may be removed (unwritten) from the message upon exiting the system. Encoded data may also be blocked/stripped for compliance with internal or legal regulations, such as GDPR, when sending to European users.

As suggested above, the encoded data (e.g., cookie) to be persisted across messages can include or be derived from specific data in a message, e.g., a hash of some or all message content, a categorization of the message or the message content, specific data from the message content (e.g., a bank account number and/or other important/interesting information that could be usable down the line and possibly dangerous if changed), an IP address or other identifier associated with the message initiator, etc.

For example, an initiating electronic communication system may process an outgoing message to produce and insert encoded data. Then, each electronic communication system that processes a related message could compare the encoded data received in the message with the message content such as to detect and flag possible tampering (e.g., if a hash value computed from the received message content does not match the hash value received in the cookie, or if a bank account number or other piece of information in the received message content does not match the information received in the cookie).

Additionally or alternatively, each electronic communication system that processes a message can store the encoded data in an archive so that, for example, the encoded data can be indexed, searchable, discoverable, and traceable. Among other things, this archiving could allow discovery of every person who had access to the message content (including misdirected messages) and discovery of relationships between people and entities who had access to the message content. The stored data can be used as a way of linking people and emails together, and this linkage information survives through activities such as replies and forwards.

Each electronic communication system that processes a message also can store information regarding user accesses to the message, e.g., each person who opened/read the message, each person who replied to the message (including whether a reply or a reply-all), each person who forwarded the message (and to whom), each person who deleted the message without reading it, each person who clicked on a link in the message, each person who copied/cut content from the message, user changes to the message (e.g., changing the subject line, editing the message content, etc.), etc. This information can be used in many contexts, e.g., tracking who accessed the message and how the message was used or changed over time, reporting such information back to the original sender or to another interested party, determining who to subpoena for litigation testimony or discovery, tracing user participation such as to divide a commission or bonus among users (e.g., sending a message to a first set of recipients seeking a candidate for an open job position and using encoded data tracking to determine specific users involved in referring the person who ultimately was hired such as if user A forwards the message to user B who forwards the message to user C who is ultimately hired and giving users A and B a commission), etc.

Similarly, a message can be tagged using encoded data (e.g., tagged as a phishing test message sent by an IT department to employees of the company) to detect and track if an employee replies to or forwards a phishing message.

Embodiments also can replace encoded data in appropriate situations. For example, if a particular message thread began with one topic or theme (with characterization information carried in encoded data) and switches to another topic or theme, then the encoded data can be replaced with characterization information relating to the new topic or theme so that, for example, messages can be appropriate archived and tracked. This information also can be helpful in detecting possible tampering.

Alternatively, embodiments can accumulate information in the encoded data. For example, if a particular message thread began with one topic or theme (with characterization information carried in encoded data) and switches to another topic or theme, then characterization information relating to the new topic or theme can be added to the prior encoded data so that, for example, the topics or themes can be tracked. This information also can be helpful in detecting possible tampering including when/where tampering occurred.

It should be noted that encoded data (e.g., cookies) carried in header or other fields can, in some instances, represent a security or privacy threat. For example, when an email or other message is replied to or forwarded with a private or confidential designation, persisting the cookie in the replied to or forwarded message could convey information from past messages that should not be available to subsequent recipients (including intermediate nodes). Thus, in some embodiments, the a given electronic communication system that processes a message can selectively remove or omit encoded data received in a past message so that the encoded data is no longer persisted.

We have described here some examples of actions that can be represented by encoded data that is included in email messages, and that can be performed upon extraction of the encoded data by authorized entities. Implementations are not limited to any particular contents of, or actions represented by, the encoded data, as the encoded data could be any transformation of information into a format that is compliant with email standards.

Figure 8:
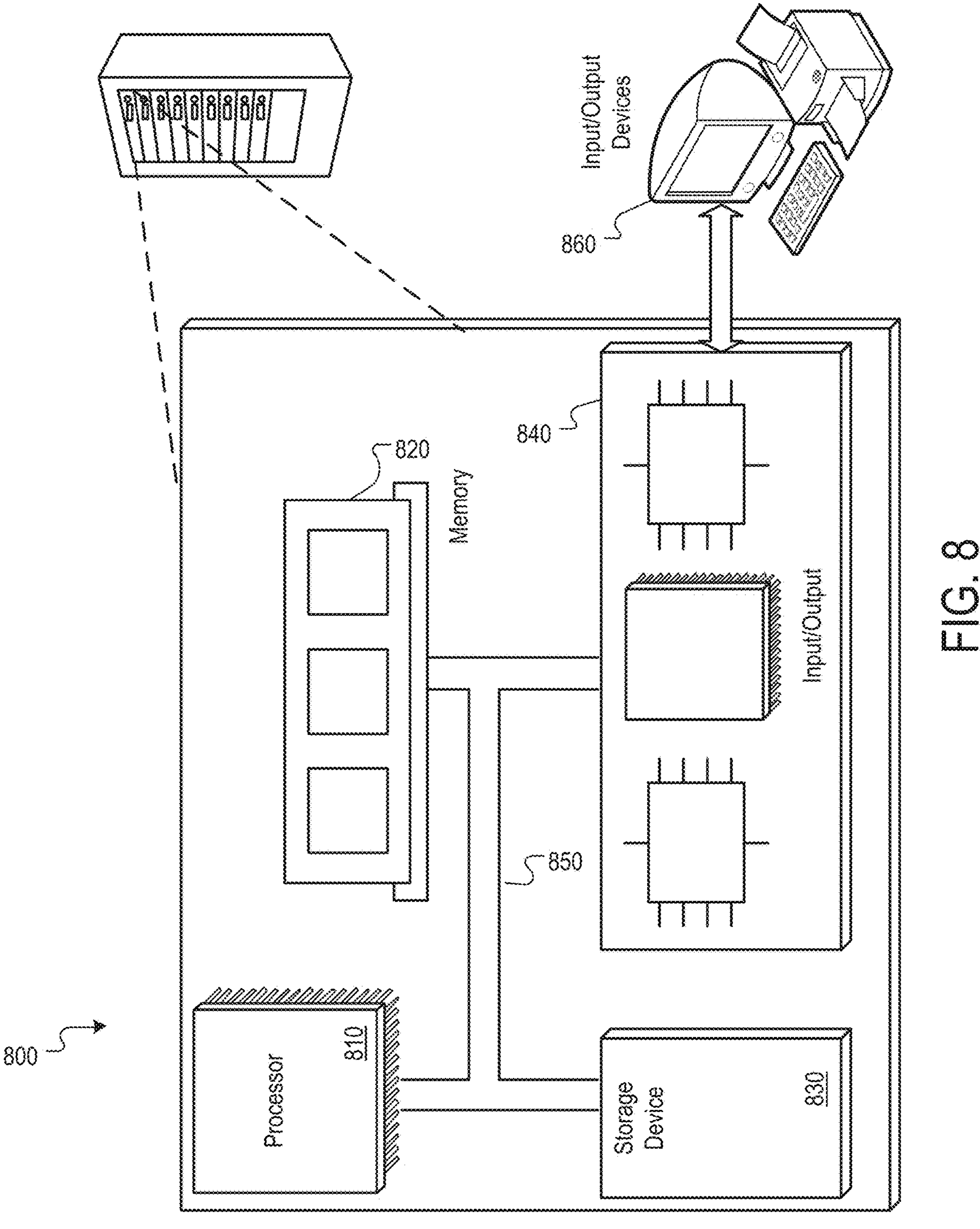

FIG. 8 is a block diagram of an example computer system 800. For example, referring to FIG. 1, one or more parts of the communications system 100 could be an example of the system 800 described here, such as the computer system (e.g., the computing systems 114, 116, 118 shown in FIG. 1) used by any of the users who access resources of the communications system 100, or a server 120 that accesses resources of the communications system 100. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor. In some implementations, the processor 810 is a multi-threaded processor. In some implementations, the processor 810 is a quantum computer. The processor 810 is capable of processing instructions stored in the memory 820 or on the storage device 830. The processor 810 may execute operations such as generating encoded data, sending and receiving email messages, extracting the encoded data, and performing actions indicated by the encoded data (e.g., FIGS. 4-6).

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a computer-readable medium. In various different implementations, the storage device 830 can include, for example, a hard disk device, an optical disk device, a solid-date drive, a flash drive, magnetic tape, or some other large capacity storage device. In some implementations, the storage device 830 may be a cloud storage device, e.g., a logical storage device including multiple physical storage devices distributed on a network and accessed using a network. In some examples, the storage device may store long-term data, such as email archives for users, or security mechanisms (e.g., the key 214 in FIGS. 2A-2D). The input/output device 840 provides input/output operations for the system 800. In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 800 to communicate, for example, transmit and receive email messages shown in FIGS. 1 and 2A-2D. In some implementations, the input/output device can include driver devices configured to receive input data and send output data to other input/output devices, e.g., keyboard, printer and display devices 860. In some implementations, mobile computing devices, mobile communication devices, and other devices can be used.

A server (e.g., a server forming a portion of the communications system 100 shown in FIG. 1) can be realized by instructions that upon execution cause one or more processing devices to carry out the processes and functions described above, for example, generating encoded data, sending and receiving email messages, extracting the encoded data, and performing actions indicated by the encoded data (e.g., FIGS. 4-6). Such instructions can comprise, for example, interpreted instructions such as script instructions, or executable code, or other instructions stored in a computer readable medium. A communications system 100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 8, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as software for generating, encoding, and extracting encoded data, and performing actions indicated by the encoded data (e.g., FIGS. 4-6), can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of a communications facility 100) is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

What is claimed is:

1. A computer implemented method for archive-less messaging, the method comprising:

at a first electronic communication system, transmitting via a communication system a first email message that includes a Message-ID field including encoded data relating to information in the first email message, wherein the encoded data stores a result of a security or threat assessment performed on the information by the first electronic communication system; and at a second electronic communication system, receiving via the communication system a second email message that includes an In-Reply-To field containing the encoded data from the first email message including the result of the security or threat assessment such that the result of the security or threat assessment is persisted across the communication system and the second electronic communication system has the result of the security or threat assessment without needing to repeat the action on the information and without the result being stored in a separate archive.

2. The method of claim 1, wherein the second electronic communication system and the first electronic communication system are the same electronic communication system.

3. The method of claim 1, wherein the second electronic communication system and the first electronic communication system are different electronic communication systems.

4. The method of claim 1, wherein the security or threat assessment includes at least one of assessment for a possible impersonation attempt, assessment of sender reputation, assessment of compliance issues, or assessment for personally identifiable information or other sensitive information.

5. The method of claim 4, wherein the second electronic communication system presents a warning to a user related to the result of the security or threat assessment.

6. The method of claim 5, wherein the security warning is presented when the user attempts to reply to the second email message.

7. The method of claim 1, wherein the encoded data is encrypted and wherein the second electronic communication system decrypts the encoded data.

8. The method of claim 1, wherein the first electronic communication system performs the security or threat assessment in a stateless manner.

9. The method of claim 1, wherein the first electronic communication system or the second electronic communication system comprises an email client or an email server.

10. An electronic communication system for archive-less messaging, the system comprising:

one or more computers and one or more storage devices storing instructions that are operable, when executed by the one or more computers, to cause the one or more computers to perform processes comprising:

at a first electronic communication system, transmitting via a communication system a first email message that includes a Message-ID field including encoded data relating to information in the first email message, wherein the encoded data stores a result of a security or threat assessment performed on the information by the first electronic communication system; and at a second electronic communication system, receiving via the communication system a second email message that includes an In-Reply-To field containing the encoded data from the first email message including the result of the security or threat assessment such that the result of the security or threat assessment is persisted across the communication system and the second electronic communication system has the result of the security or threat assessment without needing to repeat the action on the information and without the result being stored in a separate archive.

11. The system of claim 10, wherein the second electronic communication system and the first electronic communication system are the same electronic communication system.

12. The system of claim 10, wherein the second electronic communication system and the first electronic communication system are different electronic communication systems.

13. The system of claim 10, wherein the security or threat assessment includes at least one of assessment for a possible impersonation attempt, assessment of sender reputation, assessment of compliance issues, or assessment for personally identifiable information or other sensitive information.

14. The system of claim 13, wherein the second electronic communication system presents a warning to a user related to the result of the security or threat assessment.

15. The system of claim 14, wherein the security warning is presented when the user attempts to reply to the second email message.

16. The system of claim 10, wherein the encoded data is encrypted and wherein the second electronic communication system decrypts the encoded data.

17. The system of claim 10, wherein the first electronic communication system performs the security or threat assessment in a stateless manner.

18. The system of claim 10, wherein the first electronic communication system or the second electronic communication system comprises an email client or an email server.

19. A computer program product comprising at least one tangible, non-transitory computer-readable storage medium having embodied therein computer program instructions for archive-less messaging which, when executed on at least one processor of an electronic communication system, performs processes comprising:

transmitting via a communication system a first email message that includes a Message-ID field including encoded data relating to information in the first email message, wherein the encoded data stores a result of a security or threat assessment performed on the information by the electronic communication system; and receiving from a second electronic communication system via the communication system a second email message that includes an In-Reply-To field containing encoded data including a result of a security or threat assessment performed on information in the second email message, wherein the results of the security or threat assessments are persisted across the communication system and the electronic communication system has the result of the security or threat assessment performed on the information in the second email message without needing to repeat the action on the information and without the result being stored in a separate archive.

20. The computer program product of claim 19, wherein the security or threat assessments include at least one of assessment for a possible impersonation attempt, assessment of sender reputation, assessment of compliance issues, or assessment for personally identifiable information or other sensitive information.

* * * * *